Jan. 14, 1964  F. F. TRAEGER  3,117,460
TRANSMISSION BELT DRIVE
Original Filed Dec. 16, 1957  2 Sheets-Sheet 1

INVENTOR.
*Franz Felix Traeger*

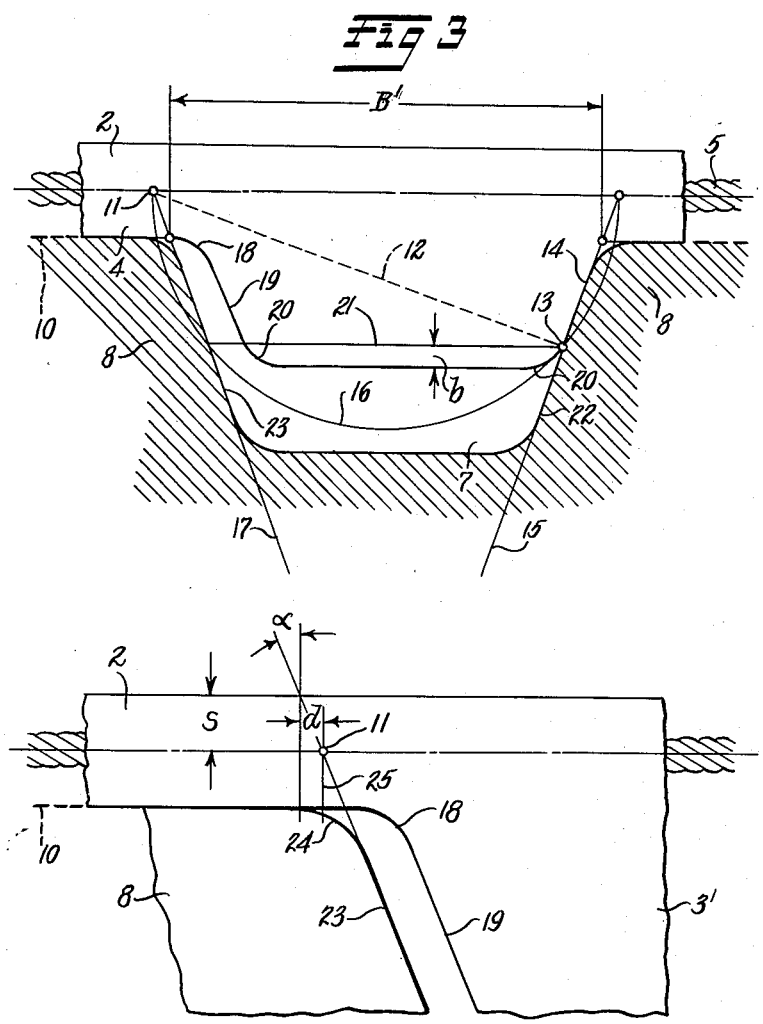

United States Patent Office 3,117,460
Patented Jan. 14, 1964

3,117,460
TRANSMISSION BELT DRIVE
Franz Felix Traeger, Hannover, Germany, assignor to Continental Gummi-Werke Aktiengesellschaft, Hannover, Germany
Continuation of application Ser. No. 703,212, Dec. 16, 1957. This application Dec. 24, 1962, Ser. No. 246,841
Claims priority, application Germany Dec. 17, 1956
6 Claims. (Cl. 74—229)

The present invention concerns a design of the teeth of enveloping drives comprising flexible belts with teeth, while the meshing teeth have plane flanks and preferably have a substantially trapezoidal cross section. This application is a continuation application of my co-pending application Ser. No. 703,212 filed December 16, 1957, now abandoned.

With drives of the above type, it is required that all belt teeth during their movement around the gear must bear along their flanks. Furthermore, a proper and above all frictionless movement of the belt teeth out of the tooth spaces of the gears must be assured. A sliding friction and a premature wear of the belt inherent thereto must under all circumstances be prevented. Therefore, it is essential that the belt teeth just about to move out of mesh with the tooth spaces of the gear must be freely lifted off and out of said tooth spaces.

It is an object of the present invention to provide an improved transmission belt with teeth, which will meet the above requirements in a proper manner.

It is another object of this invention to provide a transmission belt with teeth, which will be characterized by high precision.

Figure 1:
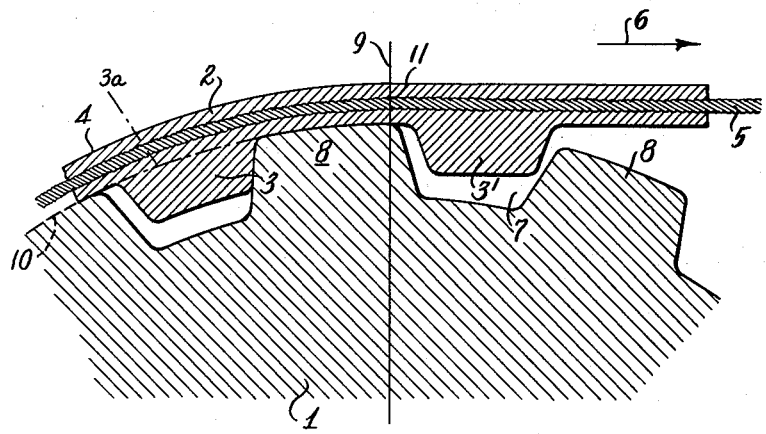

These and other objects and advantages of the invention will appear more clearly from the following specification in connection with the accompanying drawings, in which:

FIG. 1 illustrates a side view of a flexible belt with teeth according to the present invention, which meshes with a correspondingly toothed wheels.

Figure 2:
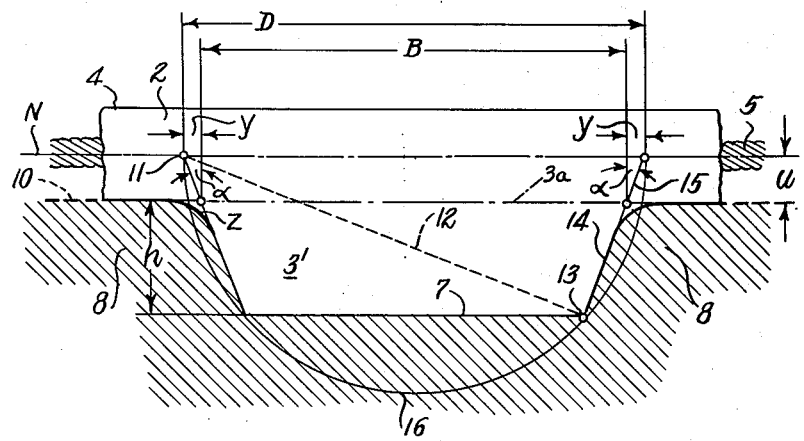

FIGS. 2 and 3 respectively illustrate a side view of a belt tooth in mesh.

FIG. 4 diagrammatically illustrates a detail of the present invention.

*General Arrangement*

The above mentioned requirements for a friction-less lifting-off of the belt teeth out of the tooth spaces of a toothed wheel are met in conformity with the present invention if the tooth flanks of the belt are determined by the chords of a semi-circle while the diameter of the semi-circle equals or slightly exceeds the width of the dedendum, and while the chords pass through the ends of the diameter line of said semi-circle. These characteristics are based on the finding that in conformity with the theorem of Thales all peripheral angles of a semi-circle are right angles and the with a polygonal deformation of the belt, the belt teeth are freely lifted off out of the tooth spaces of the toothed wheel if the tooth flanks of the belt and of the toothed wheel as they are determined by the chords form a right angle with an imaginary line which passes on one hand through that upper edge of the belt tooth which faces the toothed wheel and is being lifted off therefrom and on the other hand passes through the turning axis about which the tooth being lifted off from the toothed wheel turns at the start of said lifting-off movement.

*Structural Arrangement*

Referring now to the drawings in detail, FIG. 1 shows a toothed wheel or gear 1 meshing with teeth 3, 3' of a flexible belt 2 which latter is made of elastically deformable material as for instance of polyurethane. Belt 2 has its continuous portion 4 which interconnects the individual teeth 3 provided with steel wires or strands 5 which are embedded in the portion 4 in such a way that they extend in the longitudinal direction of the belt and are arranged alongside each other in a transverse plane of the portion 4. The belt 2 is moved in the direction indicated by the arrow 6. The wires or strands 5 are preferably arranged in the neutral zone of portion 4.

Inasmuch as the belt 2 when leaving the tooth spaces 7 between the teeth 8 has to move from a flexed or curved condition into a straight condition, the situation may also be viewed so as if the individual belt elements are rotated about a certain turning point or center of rotation. These belt elements are formed by the teeth 3, 3' of the belt 2 which are not flexible or only to a rather minor extent. At the start of this rotation, the turning point or center or rotation will be located on a line 9 perpendicular to the addendum circle or addendum line 10 of the gear 1 and, more specifically, upon a vertical line 9 (FIG. 1) which passes through the adjacent edge portion of the tooth space 7. The location of this center of rotation on the vertical line 9 is determined by the arrangement of the non-extensible tension layer of belt 2 which layer comprises the strands 5. The center of rotation may also theoretically be assumed to lie at the intersection between the vertical line 9 and the central line of the tension layer.

Actually, however, the material enveloping the strands 5 will exert an influence in such a way that a precise ascertainment of the location of the center of rotation on the vertical line 9 will not be possible. Probably the said center of rotation will be located slightly below the longitudinal central line of the wire strands 5. It is, however, of no disadvantage if it is assumed that the center of rotation is located at the intersection of the vertical line 9 with the longitudinal central line of the strands 5 and if the longitudinal central plane determined by the strands 5 or the length thereof will furnish the basis for the division and the profile of the teeth.

The assumed center of rotation 11 or the transverse axis of the belt at this point represents the tilting axis of the tooth 3' at the instant in which tooth 3' begins to lift itself out of the tooth space 7. During the further movement of the tooth 3' out of the tooth space 7, the center of rotation 11 will move along the belt in a direction opposite to the direction of movement indicated by the arrow 6. The turning or tilting radii of that portion of the belt 2 which moves out of the teeth are thus during this movement increasing more and more. Short tilting radii, however, represent an unfavorable condition with regard to the movement of the belt teeth out of the tooth spaces of the gear. Therefore, it is expedient to assume the turning point or center of rotation at 11, inasmuch as this turning point at 11 is most unfavorable with regard to lifting the teeth of the belt out of the tooth spaces of the gear.

If a friction-free lifting-out movement of the teeth 3' out of the tooth spaces 7 is to be assured, the height of the tooth 3' must be so determined that an assumed line 12 passing through the turning point or center of rotation 11 will be perpendicular at 13 with regard to the straight flanks 14. It will be evident that when the tooth 3' is tilted about the axis 11, the flank 14 will immediately and in a friction-free manner be lifted off the correspondingly extending flank of the tooth 8 of gear 1. This requirement is met when the tooth flanks 14 of the belt 2 are determined by the chord 15 of a semi-circle 16. The diameter of said semi-circle will with a continuous portion 4 of infinitely small layer thickness equal the width B of the dedendum whereas with a continuous portion 4 with finite layer thickness, as illustrated in the drawing, the diameter D of the semi-circle will be slightly greater than the width B of the dedendum namely by the amount $2y$ as will best be understood from FIG. 2. In FIG. 2, $\alpha$ designates the angle of the flank of a belt tooth, while $y$ designates half the difference between the diameter D and the width B of the dedendum. With actually produced belts according to the present invention, the angle $\alpha$ varies from approximately 37° to 45°, while an angle $\alpha$ from 40° to 42° has proved most advantageous. The character $u$ designates half the thickness of the belt portion interconnecting the belt teeth. It will thus be evident that $y = u \tan \alpha$. Inasmuch as $D = B + 2y$, it will be obvious that $D = 2(u \tan \alpha) + B$. It will thus be clear from this formula that with decreasing value of $u$, the value of D will approach the value of B. It may be added that in practice it has been found most expedient to assume the diameter line of the semi-circle 16 to be located in the neutral plane of the belt or more specifically the neutral plane of the portion 4 interconnecting the belt teeth. Generally it is, however, very difficult to precisely determine the neutral plane of the belt portion 4. On the other hand, it has been found that slight deviations of the location of the diameter line from the neutral zone will not harmfully affect the present invention. It will suffice if the diameter line is substantially or approximately located in the neutral plane of the belt portion 4. With a belt having reinforcing inserts 5 as illustrated in the drawings, the diameter line of the semi-circle 16 may be assumed to be located within the reinforcing inserts 5, preferably along the longitudinal central plane of said reinforcing inserts.

In addition to the above mentioned requirements, it is necessary that the chords 15 of said semi-circle 16 pass through the ends of the diameter line, i.e., through the assumed turning point 11.

The above mentioned requirements lead to relatively flat and wide teeth which become the flatter, the higher the turning point 11 is moved in the direction toward the back surface of the belt, in other words the higher the location of the pitch circle determined by the turning point or center of rotation 11. On the other hand, it is desirable that the tooth width will not become too great because it is desirable to obtain a very small wheel diameter with a great number of teeth. On the other hand again it is expedient to make the tooth relatively high in order to obtain a lower specific load on the flank and thereby a reduced deformation of the tooth. These two requirements can be met without disregarding the other above mentioned requirements.

Inasmuch as the tooth edges are expediently rounded, it is possible on one side of the tooth 3', in conformity with FIG. 3 to start a rounding 18 from the chord 17 which determines the theoretical width B' of the dedendum, and to design the adjacent flank 19 so that it runs parallel to the chord 17. The distance between the flank 19 and the chord 17 is not critical, it is merely intended to provide a frequently desirable play. According to the specific showing of FIG. 3 the distance between the flank 19 and the chord 17 is approximately $\frac{1}{10}$ or 10% of D. However, it is to be understood that the said distance may also be smaller but may also be greater and is theoretically limited by the strength of the belt tooth. If this belt tooth is able to transmit relatively high circumferential forces, the flank 19 may be spaced from the chord 17 of flank 23 of the toothed wheel by a distance greater than the above mentioned value. In other words, the said distance may assume a magnitude as is permissible by the strength of the material for the belt and especially by the strength of the material for the belt teeth. However, it is to be kept in mind that at any rate when designing the teeth for the belt, this design must be based on the basic form of the tooth according to FIG. 2. In other words, at a certain shape of the tooth space 7, the design of the teeth of the belt must be based on the theoretical shape of the belt tooth shown in FIG. 2 which pertains to the said tooth space 7.

It should furthermore be kept in mind that the spacing between the flank 19 and the flank 23 or chord 17 must be so selected that under no circumstances must the point 11 be located further toward the left with regard to FIGS. 2 and 3 of the attached drawings since in such instance a line drawn from a point left of point 11 of FIGS. 2 and 3 would not form a right angle with the flank 14. Consequently strong frictional forces and deformations of the belt teeth would occur when these teeth are leaving the respective tooth spaces of the toothed wheel. As indicated above, it is the very essence of the present invention practically to avoid or prevent such high frictional forces.

If it is desired to increase the height $h$ of the belt teeth, it is necessary to round the tooth flank edges which face the toothed wheel, at 20. This should be done so that the desired increase $b$ over the line 21 is still located inside the periphery of the semi-circle 16; in other words the transverse section of the thus enlarged tooth must be located within the semi-circle 16. Such an increase in the height of the tooth will not at all affect the proper moving out of the respective belt tooth from the respective tooth space of the toothed wheel. On the other hand, such increase in the height of the tooth has the advantage that an increase in the contacting surface of the flank is obtainable when the tooth deforms somewhat and as a result thereof causes the rounding 20 to contact flank 22 of tooth space 7 to a certain extent.

The height of the belt teeth or the location of the line 21 is automatically obtained from the values D and $\alpha$. The increase of the tooth downwardly beyond the line 21, namely the value $b$ is not critical provided that those parts of the belt tooth which extend beyond the line 21 are, as stated above, located inside the semi-circle 16. The contours of the belt tooth are thus defined by the lateral flanks 14 and 19 or chords 15 and 17 on one hand and by the semi-circle 16 on the other hand.

It may be added that a free play between the belt tooth and the bottom of the tooth space 7 of the toothed wheel is theoretically not necessary. In other words, theoretically the belt and the toothed wheel may be designed as shown in FIG. 2 of the drawing. However, in order to avoid the formation of noises and air enclosures, it is advantageous to make the tooth space 7 deeper while considering the location of the chords 15 and 17. In other words, the depth of the tooth space 7 may expediently be made greater than the height of the tooth of the belt in order to avoid formation of noises and air enclosures.

The teeth of the toothed wheel 1 are likewise selected in conformity with the conditions determined by the semi-circle 16. In other words, the flanks 22 and 23 are determined by the chords 17 and 15 in conformity with FIG. 3. The maximum possible depth of the tooth spaces 7 is, however, dependent on the dimensions and the diameter of the toothed wheel 1.

According to a further development of the invention, the wheel teeth 8 have their upper edges rounded at 24 (FIG. 4) to such an extent that this rounding merges with the addendum line 10 not earlier than where a perpendicular line 25 from point 11 is drawn to line 10. For reasons of safety, however, it is expedient to dimension the rounding 24 so that it will merge with the addendum line 10 only by a distance $d$ behind the point of intersection of line 25 with line 10. This will increase the width of support between the teeth 8, i.e., the effective width of the tooth spaces 7, so that under all circumstances tilting radii will be avoided which are shorter than the line 12 representing the tilting radius. The magnitude $d$ is best selected in conformity with the flank angle and the thickness S of the belt portion which interconnects the belt teeth. Expediently the magnitude $d$ is selected in conformity with the formula $d = S \tan \alpha$.

Inasmuch as when the belt teeth are being lifted out of the tooth spaces of the toothed wheel, supporting belt flanks are lifted out of the tooth spaces of the toothed wheel, it is here that the most favorable conditions appear.

However, the favorable effects obtained by the arrangement according to the present invention also occur during the running-in period of the belt teeth even if belt flanks 19 are selected which are not or only slightly spaced from the flank 23 of the gear teeth 8.

It may be added that it is possible to select various flank angles, which means to meet the requirements of the invention, if, for instance, the chord 17 is tilted about the adjacent turning point 11 which is always located at the end of the diameter line. In practice, however, the layout of the teeth starts with the width of the dedendum at the dedendum line 3a and with certain flank angles in order to obtain a trapezoidal shaped tooth.

Summarizing the invention, it may be said that the principle of the present invention is based on the following considerations which will best be understood in connection with FIG. 2. If N represents the neutral plane of the belt portion interconnecting the teeth, a friction-free lifting of the tooth flanks out of the respective tooth spaces of the toothed wheel will always be assured if line 12 forms with the chord 14 a right angle at the edge 13 which is most unfavorable for the entry into and the lifting out of the respective belt tooth from the respective tooth space of the toothed wheel, and when line 12 intersects the neutral plane at a point 11 which is located above or nearly above the adjacent edge Z of the adjacent wheel tooth.

It is, of course, to be understood that the present invention is not limited to the specific construction shown in the drawings but also comprises any modifications within the scope of the appended claims.

What I claim is:

1. In combination in a belt drive comprising a toothed wheel and a belt having teeth meshing with the teeth of said wheel and also having an interconnecting belt portion interconnecting the teeth of said belt, the intermeshing teeth having a substantially trapezoidal cross section, in which the flanks of each belt tooth lie on chords of a semi-circle having its diameter line located at least approximately in the neutral zone of said interconnecting belt portion, said chords respectively extending from the ends of said semi-circle to the intersection of said semi-circle with the addendum line of the belt tooth, said diameter line having a total length differing from the width of the dedendum at the dedendum line of the respective belt tooth at maximum by $2(u \tan \alpha)$, $u$ representing the distance from the wheel perimeter contacting side of said interconnecting belt portion approximately to the neutral zone of said interconnecting belt portion, and $\alpha$ defining the angle formed by one of the tooth flanks of the respective belt tooth and a line drawn from the point of intersection of said last mentioned flank with said side of said interconnecting belt portion at substantially a right angle to the neutral zone of said interconnecting belt portion.

2. In combination in a belt drive comprising a toothed wheel and a belt having teeth meshing with the teeth of said wheel and also having an interconnecting belt portion interconnecting the teeth of said belt, the intermeshing teeth having a substantially trapezoidal cross section, in which the flanks of each tooth of said toothed wheel lie on chords of a semi-circle having its diameter line located at least approximately in the neutral zone of said interconnecting belt portion, said chords respectively extending from the ends of said semi-circle to the intersection of said semicircle with the addendum line of a belt tooth, said diameter line having a total length differing from the width of the dedendum at the dedendum line of the respective belt tooth at maximum by $$2(u \tan \alpha)$$

$u$ representing the distance from the wheel perimeter contacting side of said interconnecting belt portion approximately to the neutral zone of said interconnecting belt portion, and $\alpha$ defining the angle formed by one of the tooth flanks of the respective belt tooth and a line drawn from the point of intersection of said last mentioned flank with said side of said interconnecting belt portion at a right angle to the neutral zone of said interconnecting belt portion, each belt tooth when in full mesh with a tooth space of said toothed wheel having one flank spaced from and substantially parallel to the adjacent flank of the respective tooth space of said toothed wheel.

3. In combination in a belt drive comprising a toothed wheel and a belt having teeth meshing with the teeth of said wheel and also having an interconnecting belt portion interconnecting the teeth of said belt, the intermeshing teeth having a substantially trapezoidal cross section, in which the flanks of each belt tooth lie on chords of a semi-circle having a diameter line of a total length differing from the width of the dedendum at the dedendum line of the respective belt tooth at maximum by $$2(u \tan \alpha)$$

$u$ representing the distance from the wheel perimeter contacting side of said interconnecting belt portion approximately to the neutral zone of said interconnecting belt portion, and $\alpha$ defining the angle formed by one of the tooth flanks of the respective belt tooth and a line drawn from the point of intersection of said last mentioned flank with the said side of said interconnecting belt portion at substantially a right angle to the neutral zone of said interconnecting belt portion, said chords respectively extending from the ends of said semi-circle to the intersection of said semi-circle with the addendum line of a belt tooth.

4. An arrangement according to claim 3 in which each tooth of the belt has substantially the same height, said height varying within the range from a line interconnecting the intersections of said semi-circle with said chords to the arc located between said line and that arc of said semi-circle which is located on that side of said line which would face the bottom of a wheel tooth space to be engaged by a tooth belt.

5. In combination in a belt drive comprising a toothed wheel and a belt having teeth meshing with the teeth of said wheel and also having an interconnecting belt portion interconnecting the teeth of said belt, the intermeshing teeth having a substantially trapezoidal cross section, in which the flanks of each belt tooth lie on chords of a semi-circle having a diameter line of a total length differing from the width of the dedendum at the dedendum line of the respective belt tooth at maximum by $$2(u \tan \alpha)$$

$u$ representing the distance from the wheel perimeter contacting side of said interconnecting belt portion approximately to the neutral zone of said interconnecting belt portion, and $\alpha$ defining the angle formed by one of the tooth flanks of the respective belt tooth and a line drawn from the point of intersection of said last mentioned flank with said side of said interconnecting belt portion at substantially a right angle to the neutral zone of said interconnecting belt portion, the wheel teeth having their upper edges adjacent their addendum line provided with a rounded portion, the contour of said rounded portion merging with the outer periphery of the respective wheel tooth and the respective adjacent flank thereof and being located within an angle defined by the extension of said last mentioned flank and a line from the intersection of said extension with the outside surface of said interconnecting belt portion at a right angle to said outer periphery of said respective wheel tooth, said chords respectively extending from the ends of said semi-circle to the intersection of said semi-circle with the addendum line of a belt tooth.

6. In combination in a belt drive: a toothed wheel, a belt having teeth meshing with the teeth of said wheel and also having an interconnecting belt portion interconnecting the teeth of said belt, the intermeshing teeth having a substantially trapezoidal cross section, and reenforcing means arranged in said interconnecting belt portion substantially in the neutral zone thereof, the flanks of each belt tooth being defined by chords of a semi-circle having its diameter line located within said reenforcing means, said chords respectively extending from the ends of said semi-circle to the intersection of said semi-circle with the addendum line of a belt tooth, said diameter line having a total length differing from the width of the dedendum at the dedendum line of the respective belt tooth at maximum by $2(u \tan \alpha)$, $u$ representing the distance from the wheel perimeter contacting side of said interconnecting belt portion approximately to the neutral zone of said interconnecting belt portion, and $\alpha$ defining the angle formed by one of the tooth flanks of the respective belt tooth and a line drawn from the point of intersection of said last mentioned flank with the said side of said interconnecting belt portion at substantially a right angle to the neutral zone of said interconnecting belt portion.

References Cited in the file of this patent

UNITED STATES PATENTS

| | | |
|---|---|---|
| 2,397,312 | Forest | Mar. 26, 1946 |
| 2,507,852 | Case | May 16, 1950 |
| 2,627,756 | Bendall | Feb. 10, 1953 |
| 2,718,790 | Hughey | Sept. 27, 1955 |
| 2,815,671 | Talipsky et al. | Dec. 10, 1957 |

FOREIGN PATENTS

| | | |
|---|---|---|
| 423,753 | Italy | July 26, 1947 |
| 435,039 | Italy | May 7, 1948 |